United States Patent [19]

Comstock

[11] 4,137,005
[45] Jan. 30, 1979

[54] OCEANIC WAVE POWERED PRIME MOVER

[75] Inventor: Walter F. Comstock, Shawnee Mission, Kans.

[73] Assignee: Outdoor Enterprises of America, Inc., Shawnee Mission, Kans.

[21] Appl. No.: 856,415

[22] Filed: Dec. 1, 1977

Related U.S. Application Data

[63] Continuation-in-part of Ser. No. 782,886, Mar. 30, 1977, abandoned.

[51] Int. Cl.² .............................................. F01D 7/04
[52] U.S. Cl. .......................................... 415/2; 290/53
[58] Field of Search ................................. 415/2–4, 415/7; 416/85; 290/43, 44, 54, 55; 417/330, 331, 332, 337

[56] References Cited

U.S. PATENT DOCUMENTS

| | | | |
|---|---|---|---|
| 1,045,654 | 11/1912 | Willy | 417/330 |
| 1,202,657 | 10/1916 | Blevins | 415/7 |
| 1,261,472 | 4/1918 | Baldwin | 415/7 |
| 1,263,865 | 4/1918 | Dale | 415/7 |
| 1,289,533 | 12/1918 | Pelton | 417/330 |
| 1,368,454 | 2/1921 | Rebman | 416/85 |
| 1,498,707 | 6/1924 | Wilcott | 416/85 |
| 3,773,432 | 11/1973 | Chow et al. | 415/152 A |
| 4,023,041 | 5/1977 | Chappell | 416/85 |
| 4,038,821 | 8/1977 | Black | 416/85 |

*Primary Examiner*—C. J. Husar
*Attorney, Agent, or Firm*—Schmidt, Johnson, Hovey & Williams

[57] ABSTRACT

A prime mover has a number of bladed rotors supported on a drive shaft over the surface of a wave-generating body of water for rotating the shafts by action of waves against the rotors. Unique planetary gearing assemblies coupling each rotor to the shaft provide necessary torque conversion for rotating the shaft at the desired speed. In preferred forms, the drive shaft is shiftably supported on a plurality of stationary pylons for up and down movement relative to the surface of the water through the action of a hydraulic lift assembly. A bank of wave height sensors is coupled to a computerized control for the lift assembly to adjust the position of the rotors in response to changes in wave height whereby the prime mover operates at maximum efficiency under the prevailing surf conditions.

13 Claims, 8 Drawing Figures

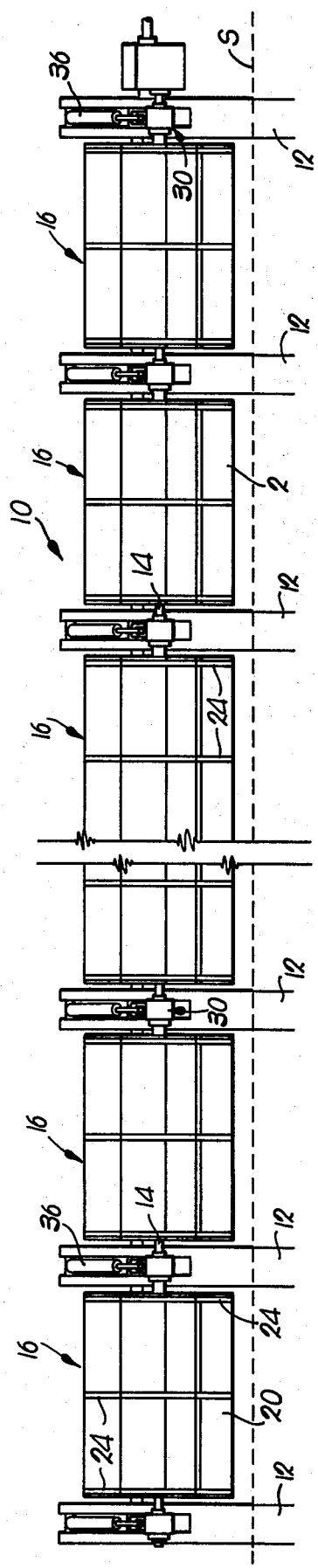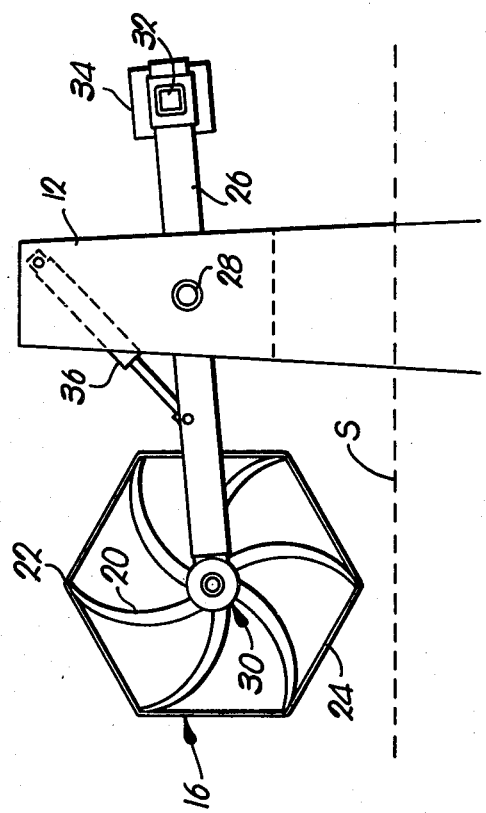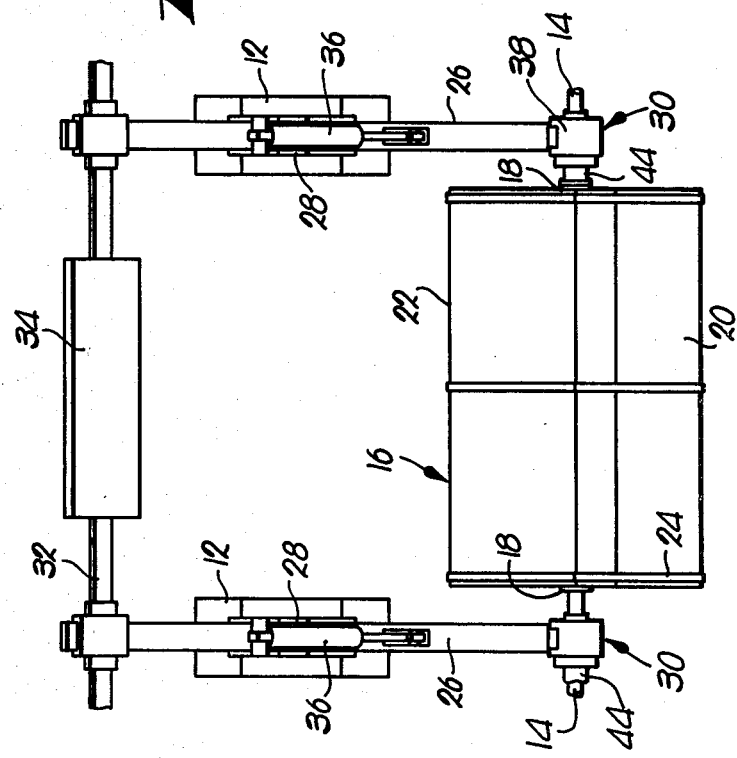

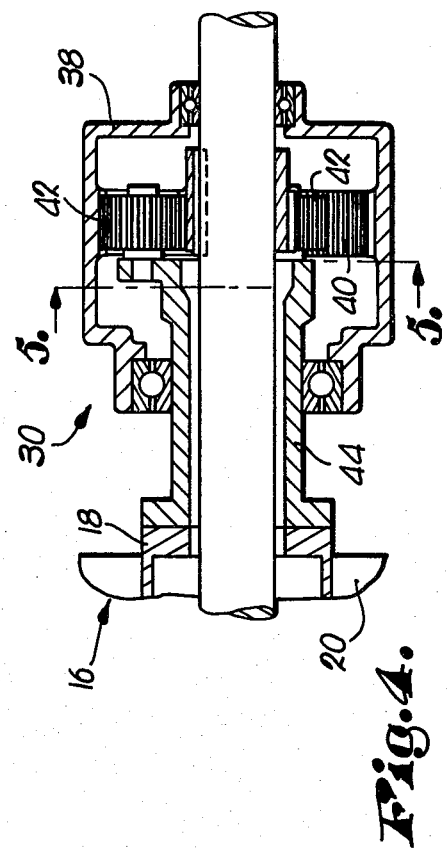
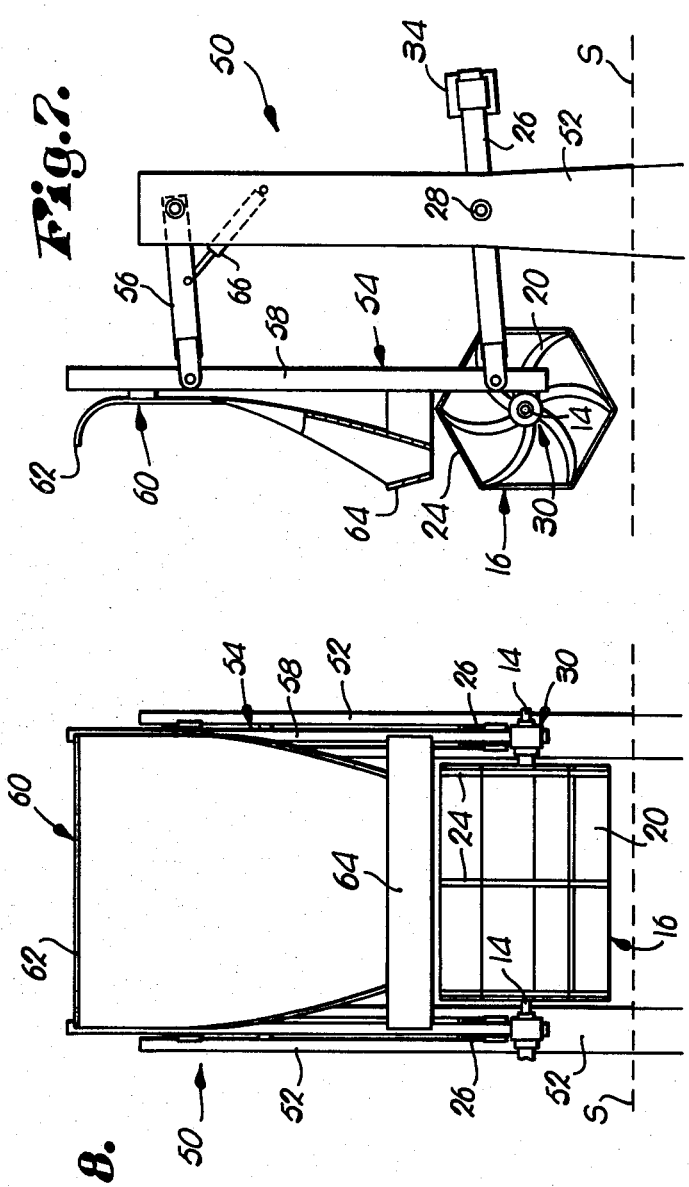
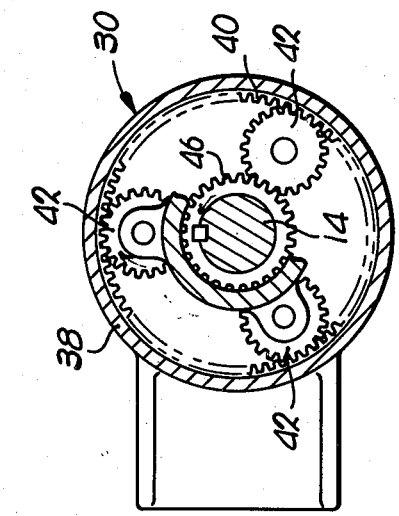
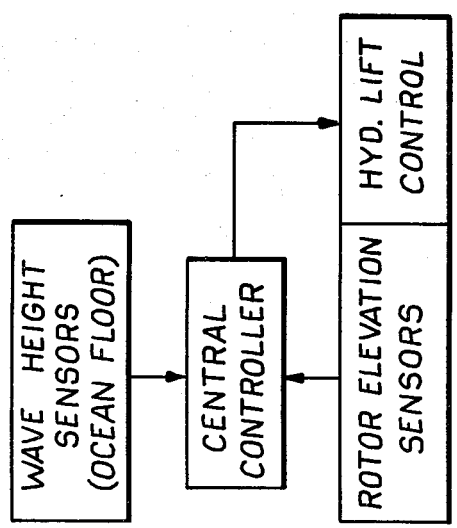

OCEANIC WAVE POWERED PRIME MOVER

This invention is a continuation-in-part of my copending prior application Ser. No. 782,886, filed Mar. 30, 1977 and now abandoned.

Background

This invention relates to energy conversion devices in general and is particularly concerned with a prime mover adapted for efficiently harnessing the kinetic energy in ocean waves.

The continued growth of the industrial nations has placed an ever increasing burden upon world energy supplies. It is now apparent that traditional sources of energy will be adequate to meet the world energy needs for only a relatively short time. In particular, the unreplenishable fossil fuels are being depleted at an ever-increasing rate, especially in industrialized nations. Virtually every credible energy study made in recent years reaches the conclusion that conventional energy supplies will be essentially exhausted in the near future unless new sources of energy are found.

Accordingly, there is an immediate, extremely critical need for development of alternate sources of energy. Various proposals for utilizing new energy sources, ranging from promising to ridiculous, have been set forth in an effort to meet the impending world-wide crisis. Almost without exception, the proposed sources of new energy present one or more serious drawbacks to their use in the foreseeable future. Many proposed sources are simply environmentally unacceptable, while others are so technically sophisticated that many years of research and development are required before they can be considered a practical alternative to conventional energy supplies. Still other new energy proposals, while not detrimental to the environment and while within the scope of our present technology, are so expensive as to render them economically infeasible at the present time.

Hence, there is clearly a demand for a source of clean, environmentally acceptable and relatively inexpensive supply of energy. One such source which has heretofore been underdeveloped is the tremendous amount of energy contained in surface water waves. While many efforts have been made to utilize water wave energy, almost all have been unsuccessful because of a failure to amplify unitized wave energy and to protect equipment from destructive wave forces. Such energy has for centuries virtually gone unused in continuous pounding of the waves along thousands of mile of shorelines, while often only miles inland scientists and inventors struggled with the perplexing problem of satisfying world energy needs. Hence, even in our highly technical, energy starved society, little progress has been made in efficiently harnessing the energy of oceanic waves.

Many of the ocean wave energy systems involve highly complex structure and are still in the initial experimental stage. One exception is the device disclosed in U.S. Pat. No. 1,498,707 issued to Wilcott. This patent shows a wave-powered water motor but fails to adequately consider such practical problems as required torque conversion, operation under storm conditions and optimal rotor positioning. Thus, the Wilcott device does not make provision for amplification of unitary wave energy nor does it have adequate protection from wave damage in storm conditions.

SUMMARY OF THE INVENTION

In an effort to overcome the aforementioned problems, the prime mover of the present invention comprises a series of bladed rotors adapted to be supported in wave-receiving relation over a body of water and having a hydraulic lift for positive height adjustment of the rotors in response to changing wave conditions. A planetary gear assembly between each rotor and the drive shaft of the prime mover accomplishes torque conversion in a desired manner such that the shaft is continuously rotated at the required speed notwithstanding the fact that the individual rotors are themselves only intermittently subjected to wave impact and accordingly revolve at a slower speed.

In preferred forms, a computerized controller is coupled with the lift assembly and receives input from electronic wave height sensors positioned on the ocean floor for the purpose of automatically adjusting the elevation of the rotors in response to the height of the incoming waves. In this manner, the rotors can be at all times positioned to receive the more effective driving force found in the upper portion or crest of a wave, and further, there is precluded undesired breaking of waves over the rotors with resultant structural damage or loss of efficiency to the prime mover.

There is also disclosed an alternate embodiment having a wave diverter capable of intercepting large maverick waves and directing the latter downwardly for additional driving impact against a rotor disposed therebelow.

BRIEF DESCRIPTION OF THE DRAWINGS

FIG. 1 is a fragmentary front elevational view of a wave powered prime mover constructed in accordance with the principles of the present invention;

FIG. 2 is an enlarged, side elevational view;

FIG. 3 is an enlarged, fragmentary plan view;

FIG. 4 is an enlarged, fragmentary cross-sectional view of the planetary gear assembly;

FIG. 5 is an enlarged, cross-sectional view taken along line 5—5 of FIG. 4;

FIG. 6 is a schematic diagram illustrating the automatic rotor elevation control system;

FIG. 7 is an enlarged, side elevational view of a second embodiment of the present invention; and FIG. 8 is a front elevational view of the embodiment shown in FIG. 7.

DETAILED DESCRIPTION

In FIGS. 1-5 there is shown an oceanic wave powered prime mover 10 comprising stationary structure in the form of a number of spaced upright pylons 12 secured in the floor of a body of water and projecting above the surface S of the latter, a generally horizontal elongate drive shaft 14 shiftably supported on the pylons 12 for up and down movement toward and away from the surface S, and a number of bladed rotors 16 coaxially carried on the shaft 14 and operably coupled therewith for driving the latter in response to wave movement past the pylons 12. Though not shown, it is contemplated that the output from shaft 14 could be utilized to mechanically power a large electric generator or the like.

Each rotor 16 comprises a central hub 18 and six radially extending blades 20 mounted in circumferentially spaced relation on the hub 18. As shown in FIGS. 1 and 2, the longitudinal axes of the blades 20 extend parallel to the shaft 14 and each blade 20 has a concavo-convex cross section tapering from the hub 18 to an edge 22 at the outer extremity of the blade 20. The curvature of the blades is hydrodynamically engineered to direct the thrust of the wave to the structurally reinforced load-bearing portion at the lower half of the blade adjacent the hub 18. A number of annular bands 24 circumscribe each rotor 16 innerconnecting the edges 22 for the purpose of increasing the rigidity of the rotors 16.

Each pylon 12 has an elongate arm 26 pivotally mounted thereon for up and down swinging movement about a generally horizontally extending trunnion 28. The trunnions 28 are disposed intermediate the ends of the arms 26, one end of each arm 26 supporting a planetary gear assembly 30 which is in turn coupled to the shaft 14 and a respective rotor 16. The opposite end of each arm 26 supports a generally horizontally extending beam 32 upon which are carried a plurality of counterweights 34 for the purpose of facilitating swinging of the arm 26 in a direction to raise the rotor 16.

Lift means in the form of a hydraulic cylinder assembly 36 for each arm 26 is provided to accomplish selective movement of the latter and desired positioning of the rotors 16. As shown in FIG. 2, the cylinder assemblies 36 are each mounted in a manner to extend between an arm 26 and the top end of a respective pylon 12 such that retraction and extension of the assemblies 36 causes up and down movement of the rotors 16. Though not shown, it is to be understood that the assemblies 36 are actuated by a common hydraulic system for in unison movement of the arms 26 and simultaneous shifting of the rotors 16.

Considering now FIGS. 4 and 5, there is illustrated the details of construction of the plantary gear assemblies 30. Each gear assembly 30 comprises a housing 38 rigidly mounted to a respective arm 26 and having formed therein a ring gear 40 circumscribing the shaft 14. Three planet gears 42 are carried by a spider member 44 in mating engagement with the ring gear 40. As shown in FIG. 4, the spider member 44 is rigidly coupled with the hub 18 of a respective rotor 16 for rotation therewith. Finally, a sun gear 46 keyed to the shaft 14 is disposed in mating engagement with the planet gears 42 whereby the latter are caused to orbit around the gear 46 upon rotation of the rotor 16. Note that the arrangement and size of the gears 40, 42 and 46 are such that the angular velocity of the rotor 16 is stepped-up in order to obtain the desired angular velocity of the shaft 14. In actual practice, it has been determined that a step-up ratio of 30 to 1 may be required in order to impart the desired angular speed to the shaft 14; of course, it may be necessary to utilize two or more planetary gears 30 in tandem to accommodate stresses and accomplish the desired speed ratio. Further, it is contemplated that an override clutch will be contained in each gear assembly 30 in order to lessen shock forces on the shaft 14 and to permit most efficient utilization of wave energy.

A computerized control for the hydraulic cylinder assemblies 36 is shown diagramatically in FIG. 6. A number of electronic wave height sensors positioned on the ocean floor monitor the height of incoming waves and transmit this information to a computer or central controller. The central controller compares this information with data received from rotor elevation sensors mounted on the rotors 16 and sends appropriate signals to a hydraulic lift control to extend or retract the cylinder assemblies 36 as required in order to position the rotors 16 at the optimum height for receiving the incoming waves. Thus, the rotors 16 are continuously raised and lowered in response to changing wave conditions whereby to maximize the efficiency of the prime mover 10. Though the height control system for the rotors 16 is itself unique, it is noted that all of the basic components of the system are commercially available, as for example from Marines Systems Division of Honeywell, Inc., Seattle, Wa.

An alternate embodiment of the present invention is shown in FIGS. 7 and 8 comprising a prime mover 50 including a plurality of rotors 16, planetary gear assemblies 30, and a drive shaft 14, as found in the prime mover 10. Additionally, the prime mover 50 is provided with a number of upright pylons 52, analogous to pylons 12 but extending a greater distance above the surface S of the body of water, and a plurality of linkage assemblies 54 pivotally mounting respective rotors 16 and the shaft 14 on the pylons 52 for up and down movement.

Each linkage assembly 54 comprises an arm 26 pivotally secured to a pylon 52 by a trunnion 28 and supporting a counterweight 34, a second arm 56 pivotally secured to the pylon 52 at a point spaced above the trunnion 28, and an elongate bar 58 interconnecting the arms 56 and 26 to form a four bar parallel linkage as shown for example in FIG. 7.

The lowermost end of each bar 58 supports a respective planetary gear assembly 30 in the manner shown and there is mounted on the bar 58 a wave diverter 60 in overlying relation to the rotor 16.

The diverter 60 is a substantially upright panel presenting an arcuate, out-turned uppermost margin 62 and a lowermost funnel-like structure 64 adapted to direct water downwardly toward the rotor 16. It is contemplated that wave diverters 60 may be employed to harness maverick waves of significantly greater dimension than the mean wave height without requiring excessive up and down movement of the rotors 16. In this connection, the rotors 16 of prime mover 50 are normally not raised to receive large maverick waves, but rather, the latter are intercepted by the deflectors 60 and directed downwardly through the funnel-like structures 64 to impart a driving force on respective rotors 16. It is important to note that inasmuch as the wave diverters 60 are mounted directly on bars 58, the diverters 60 move up and down with the rotors 16 such that the structures 64 are always properly positioned relative to the latter.

A hydraulic cylinder assembly 66 is mounted between each pylon 52 and its respective second arm 56 to provide powered shifting of the linkages 54 and consequent up and down movement of the rotors 16. Cylinder assemblies 66 are actuated by a single hydraulic system similar to the actuating system for cylinder assemblies 36.

Operation of the prime movers 10 and 50 is apparent from the foregoing detailed description. In the case of prime mover 10, incoming waves on surface S are intercepted by the blades 20 of rotors 16 such that rotary movement is imparted to the shaft 14 through the planetary gear assemblies 30. The rotary movement of the shaft 14 may have any number of beneficial applications such as for example driving a large electric generator. In this latter regard, note that the planetary gears 30 including their override clutch feature permit continuous high speed rotation of the shaft 14 notwithstanding the fact that waves are only intermittently intercepted by the individual rotors 16.

During operation of the prime mover 10, it is desirable to maintain the rotors 16 at an optimum wave intercepting height in order to derive maximum operating efficiency. Preferably, the height of rotors 16 is adjusted such that each wave is intercepted by only the lower portion of the rotor 16. Manifestly, the wave height is not uniform but varies from wave to wave, and consequently, it is necessary to adjust the height of the rotors 16 in response to changes in the height of the incoming waves. This desired continuous height adjustment for the rotors 16 is accomplished by the lift control system shown diagramatically in FIG. 6.

Raising of the rotors 16 is facilitated by the provision of counterweights 34 which substantially balance the force moments about trunnion 28. Hence, only a relatively small force need be exerted by the cylinder 36 in order to accomplish movement of the arm 26 in a direction to raise the rotor 16. Of course, under storm conditions, it may be desirable to operate cylinder 36 in such a manner as to raise the rotors 16 a maximum distance above surface S until normal surf conditions return.

The operation of prime mover 50 is substantially the same as that of prime mover 10 with the exception that the rotors 16 are not raised in response to maverick waves with which exceed the mean wave height by a predetermined dimension. When such waves are encountered, the rotors 16 remain at their normal operating position, the diverters 60 serving to deflect the maverick wave in a manner to drive the rotor 16 as explained hereinabove.

From the foregoing, it can be seen that the present invention offers unique means for efficiently harnessing the energy in oceanic waves. The provision of planetary gears 30 assures rotation of shaft 14 at a speed which is practical for operation of electrical generators or the like, the override clutch feature protecting against undesirable drag and severe impact on the shaft 14 by the rotors 16.

The hydraulic cylinders 36 accomplish positive height control for the rotors 16 while at the same time permitting implementation of automatic rotor elevaton control. In this latter regard, the automatic lift control system disclosed contemplates continuous adjustment of the height of rotors 16 in response to changing wave conditions such that the prime movers 10, 50 operate at maximum efficiency.

What I claim is:

1. A prime mover for harnessing energy in surface waves on a body of water, said prime mover including:
    drive means including a generally horizontally disposed drive shaft and at least one power rotor coaxially supported on the shaft;
    stationary structure extending upwardly beyond the surface of said body;
    mechanism shiftably mounting said drive means on said structure for up and down movement over said body;
    said rotor having a central hub and a number of radially projecting wave-engageable blades secured to the hub for powered rotation by said waves;
    a planetary gear assembly operably coupling said rotor and said shaft for in unison rotation,
    said gear assembly including a speed multiplier for rotation of said shaft at a speed greater than said rotor,
    lift means for selectively shifting said drive means toward and away from said surface whereby to permit positive optimum positioning of said rotor relative to said surface for advantageous wave engagement; and
    a control for said drive means, there being a wave height sensor coupled with said control for shifting said drive means in response to changes in wave height.

2. The invention of claim 1, said sensor being spaced from said lift means in the direction of said waves, whereby to permit sufficient response time for shifting said drive means.

3. The invention of claim 1, said mechanism including a pair of parallel spaced arms pivotally mounted on said structure for up and down swinging movement.

4. The invention of claim 3, said arms being mounted intermediate the ends of the latter, said shaft being rotatably supported by one end of each arm.

5. The invention of claim 4, the other ends of said arms being intercoupled and having a counterweight to facilitate shifting movement of said drive means.

6. The invention of claim 5, said lift means comprising a hydraulic cylinder assembly extending between said structure and said arms.

7. The invention of claim 1, said structure comprising a plurality of spaced pylons anchored to the floor of said body.

8. The invention of claim 1; and a wave deflector mounted on said structure over said rotor for directing waves of excessive height downwardly toward said rotor.

9. The invention of claim 1, said blades being concavo-convex in transverse cross section.

10. The invention of claim 1, said blades each having an outermost edge remote from said shaft, each blade being transversely tapered toward its outermost edge.

11. The invention of claim 10, said rotor having binding means circumscribing the same for holding the blades circumferentially spaced.

12. The invention of claim 1, there being six of said blades on said rotor for achieving required torque on said shaft.

13. The invention of claim 1, said drive means comprising a plurality of said rotors supported end-to-end on said shaft, there being a planetary gear assembly for each rotor.

* * * * *